July 7, 1970  G. PRADEL ET AL  3,519,829

OPTICAL SYSTEM FOR RADIATION SENSITIVE RANGEFINDER

Filed Oct. 10, 1967

INVENTOR
Georg Pradel
Roy Röder
Heinz Richter

BY

ATTORNEY

United States Patent Office 3,519,829
Patented July 7, 1970

3,519,829
OPTICAL SYSTEM FOR RADIATION SENSITIVE RANGEFINDER
Georg Pradel, Heinz Richter, and Rolf Roder, Jena, Germany, assignors to VEB Carl Zeiss Jena, Jena, District of Gera, Germany
Filed Oct. 10, 1967, Ser. No. 674,710
Int. Cl. G01c *3/08*
U.S. Cl. 250—216     6 Claims

ABSTRACT OF THE DISCLOSURE

An electro-optical rangefinder has two optical systems and two light-sources. The one light-source through one of the optical systems emits intensity-modulated invisible light for measurement The other light-source emits visible light and together with the other of the two optical systems makes up into a searchlight. Said other light-source lies at such a focus of said one optical system as corresponds to the medial wave-length of the light it emits. To the optical system not emitting visible light is coordinated an eyepiece for visual reception of the visible light. The two optical systems may be coaxial with each other.

---

This invention relates to electro-optical rangefinders comprising a radiation source emitting invisible light of modulated intensity and two optical systems for respectively transmitting and receiving this light.

Some known electro-optical rangefinders have a radiation source emitting visible light the beam of which is modulated in intensity and then transmitted through an optical system that serves at the same time for spotting a distant reflector. Other such rangefinders with radiation source emit and receive invisible light. Locating a remote reflector by means of an electro-optical rangefinder of that kind presents considerable difficulties, which can only be obviated by the simultaneous use in the measuring process of a separate search light. This separate searchlight and the orientation it is required to impart to the electro-optical rangefinder, incur considerable material expenditure and complicate the measuring process.

The present invention aims at providing an electro-optical rangefinder using invisible light for measuring which is equipped with a searchlight that involves only a minimum of material and technical complexity.

To this end the invention consists in an electro-optical rangefinder of the foregoing kind wherein a light-source emitting visible light is located at such a focus of one of the optical systems as corresponds to the medial wavelength of its light beam. If this optical system is a surface mirror, the position of the focus is of course independent of wave-length. On principle, the light-source supplying visible light may be conjugate to the transmitting or to the receiving optical system of the electro-optical rangefinder. However, it is very often advisable to co-ordinate the source of visible light to the optical system emitting the intensity-modulated beam. A further simplification in the set-up of such rangefinders can be obtained by providing that the optical system not serving as searchlight is in the form of a sighting telescope. Advantageously the beam of the light-source emitting visible light and that of the radiation source emitting invisible light are so directed to a selectively silvered surface that this surface reflects to the transmitting optical system either the invisible or the visible light and lets the other pass unobstructed.

Advantageously the transmitting and the receiving optical system have a common optical axis. According to a further feature of the invention, both systems are jointly rotatable about a horizontal and a vertical axis, both rotations being measurable.

Figure 1:
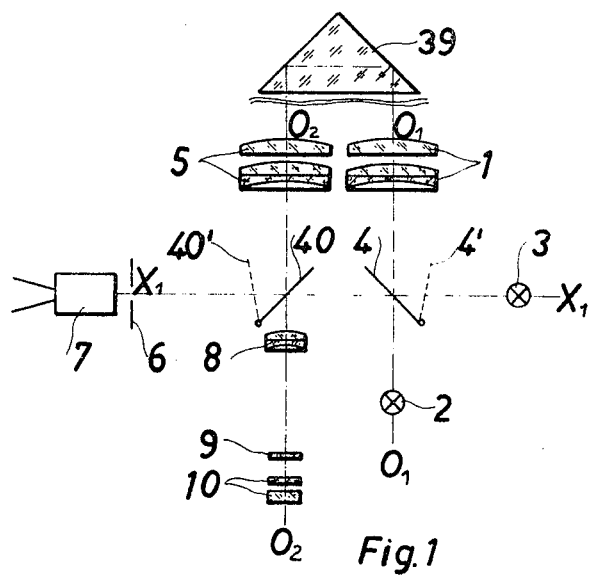
Figure 2:
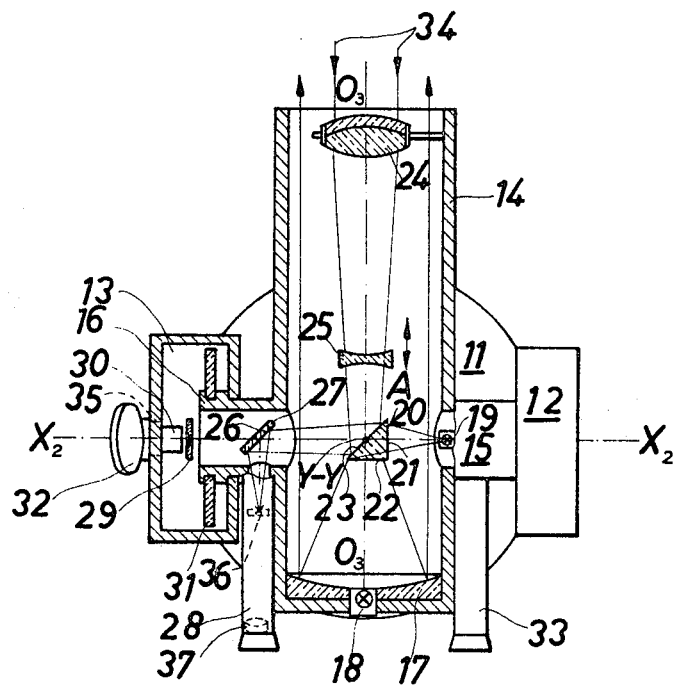

In order that the invention may be more readily understood, reference is made to the accompanying drawings which illustrate diagrammatically and by way of example two embodiments of an electro-optical rangefinder, and in which:

FIG. 1 shows the optical parts of an embodiment with separate optical systems for transmitter and receiver, and FIG. 2 shows the optical parts of another embodiment with coaxial optical systems for transmitter and receiver.

In the embodiment shown in FIG. 1, a light-source 2 emitting visible light and a radiation source 3 emitting invisible light are located respectively in two foci of a transmitting optical system 1. The source 2 lies in the optical axis $O_1$—$O_1$ of the system 1. The source 3 lies at one side of this axis, its light being directed to the system 1 by means of a folding mirror. The mirror 4 is so tiltable into two positions that a remote reflector 39 receives either visible spotlight (position 4') or invisible measuring light (position 4).

A receiving optical system 5, equal to the transmitting system 1, has an optical axis $O_2$—$O_2$ parallel to the axis $O_1$—$O_1$. The focus of the system 5 lies in a diaphragm 6 coordinated to an electric receiver 7. The modulated invisible light of the radiation source 3 reflected by the remote reflector, traverses the optical system 5, is reflected by the remote reflector, transverses the optical system 5, is reflected at a folding mirror 40, arrives at the diaphragm 6 outside the optical axis $O_2$—$O_2$ and enters the receiver 7. The center of the diaphragm 6 and that of the radiation source 3 lie in an axis $X_1$—$X_1$ which is at right angles to the optical axes $O_1$—$O_1$ and $O_2$—$O_2$ and is the common axis of rotation of the two systems 1 and 5.

The optical axis $O_2$—$O_2$ contains a focussing lens 8, a graduated plate 9 and an eyepiece 10, which together with the optical system 5 make up into a sighting telescope. If the mirror 4 and the mirror 40 respectively assume the positions 4' and 40', the light of the light-source 2 is directed through the optical system 1 and reflected by the remote reflector, whereupon it enters the sighting telescope 5, 8, 9, 10 and, if accurately oriented and focussed, forms on the plate 9 an image of the reflector. When, and not before, the image of the reflector lies at the center of the graduated plate 9, the folding mirrors are to be tilted into the positions 4 and 40, whereupon the distance can be measured by means of the receiver 7 and the modulated light striking it, this light being converted for range display. The simultaneous tilting of the two mirrors may be operated by a suitable mechanism.

In the embodiment shown in FIG. 2 of the drawings, two supports 12 and 13 are mounted on an alidade 11 rotatable about an axis Y—Y at right angles to the plane of the drawing. A telescope 14 is rotatable about an $X_2$—$X_2$ by means of two hollow trunnions 15 and 16 extending into the supports 12 and 13. The telescope 14 contains a concave mirror 17 for light projection. A radiation source 18 supplying modulated invisible light is provided near the apex of the mirror 17. A visible-light source 19 in the trunnion 15 and the invisible-radiation source 18 are both located at foci of the concave mirror 17. A right-angled prism 20 is so disposed in the telescope 14 that its cathetus surfaces 21 and 22 are respectively conjugate to the light-source 19 and the radiation source 18. The cathetus surface 22 is selectively silvered, so that the divergent light rays from the radiation source 18 are reflected to the concave mirror 17. The divergent rays of the light-source 19 are reflected by the hypotenuse surface 23 in the prism 20. They traverse the selectively silvered cathetus surface 22 and arrive at the concave mirror 17, which directs them as a beam of parallel rays to a remote reflector similar to the reflector 39 of FIG. 2. The light-source 19 and the radiation source 18 can alternately be switched on and off.

The telescope 14 also contains an optical receiving system comprising an objective 24 and a focussing lens 25, the optical axis $O_3$—$O_3$ of this system coinciding with that of the concave mirror 17. Whereas the objective 24 is rigidly connected to the telescope 14, the focussing lens 25 in the telescope is displaceable along the directions of the arrow A.

The trunnion 16 contains a plane mirror 26 which is rotatable about an axle 27 at right angles to the plane of the drawing. A tube 28 fast with the trunnion 16 contains a graduated plate 36 and an eyepiece 37 which together with the optical system 24, 25 make up into a sighting telescope.

The support 13 contains a diaphragm 29 conjugate to a photoelectric receiver. The diaphragm 29 and the receiver 30 are so located that their centers lie in the axis $X_2$—$X_2$. The diaphragm 29 and the cross line on the graduated plate 36 in the tube 28 lie within the image distance of the optical system 24, 25. A beam 34 of parallel light rays reflected by the remote reflector traverses the optical system 24, 25 and is transmitted as a converging beam to the hypotenuse surface 23 of the prism 20, whence this beam is directed either to the plane of the graduated plate 36 or to that of the diaphragm 29, depending on whether the light is of the visible or the invisible kind and according to the respective position of the mirror 26. A range is determined by the modulated light that emanates from the radiation source 18 and which in a similar manner to FIG. 1 is so reflected from the remote reflector as to travel through the optical system 24, 25, 23 to the plane of the diaphragm 29, and by the receiver 30 which the impinging light signal causes to display the range.

In the embodiment shown in FIG. 2, the light-source 19 emits visible light via the prism 20 and the concave mirror 17, which serves as spotlight projector. The light returned by the remote reflector travels by way of the objective 24, the focussing lens 25, the hypotenuse surface 23, the mirror 26 and arrives in the optical system in the tube 28, which serves as sighting telescope.

In the support 13, a vertical graduated dial 31 is fast with the trunnion 16. The readings on the dial 31 can be taken by means of a mirror 32 on the support 13, an aperture 35 in the support 13 and a reading microscope 33 fast with the trunnion 15. The microscope 33 can also be used for reading the values of the rotations of the telescope 14 about the axis Y—Y.

The embodiments of the invention particularly described are represented merely as examples of how the invention may be applied, many modifications being possible in the construction and relative positions of the optical systems and the light-sources.

We claim:
1. An electro-optical rangefinder comprising:
a radiation source supplying invisible modulated light,
an optical system for transmitting said modulated light subsequently to reflection by a remote reflector,
a photo-electric receiver receiving said modulated light,
a light-source supplying visible light,
said light-source being disposed at such a focus of one of said two optical systems as corresponds to the medial wavelength of the visible light,
said one optical system emitting the visible light,
the other of said optical systems receiving the visible light reflection of same at said reflector,
and an eyepiece system coordinated to the optical system receiving the visible light,
said eyepiece system being for visual observation of the visible light reflected by said reflector.

2. An electro-optical rangefinder as claimed in claim 1, wherein the optical system traversed by said modulated light is in the form of a sighting telescope.

3. An electro-optical rangefinder as claimed in claim 1, wherein the source of visible light in coordinated to the optical system emitting the intensity-modulated beam.

4. An electro-optical rangefinder as claimed in claim 1, wherein the optical systems have a common optical axis.

5. An electro-optical rangefinder as claimed in claim 1, wherein said reflector is coordinated to a right-angled prism, the cathetus surface of the prism which faces the reflector being selectively silvered.

6. An electro-optical rangefinder as claimed in claim 5, wherein both systems are jointly rotatable about a horizontal and a vertical axis.

References Cited

UNITED STATES PATENTS

| | | | |
|---|---|---|---|
| 2,966,090 | 12/1960 | Scholdstrom | 356—5 |
| 3,035,176 | 5/1962 | Kis et al. | 365—3 X |
| 3,146,446 | 8/1964 | Novitsky | 250—220 X |

WALTER STOLWEIN, Primary Examiner

U.S. Cl. X.R.

356—4